Aug. 26, 1958  C. L. KEREKES  2,849,126
CENTRALIZE INDEX AND DRIVER FOR STORAGE AND PARKING
Filed May 23, 1955  14 Sheets-Sheet 1

Coleman Louis Kerekes
INVENTOR.

BY
Attorneys

Aug. 26, 1958 C. L. KEREKES 2,849,126
CENTRALIZE INDEX AND DRIVER FOR STORAGE AND PARKING
Filed May 23, 1955 14 Sheets-Sheet 2

Coleman Louis Kerekes
INVENTOR.

BY *Clarence A. O'Brien*
*and Harvey B. Jacobson*
Attorneys

Aug. 26, 1958 C. L. KEREKES 2,849,126
CENTRALIZE INDEX AND DRIVER FOR STORAGE AND PARKING
Filed May 23, 1955 14 Sheets-Sheet 3
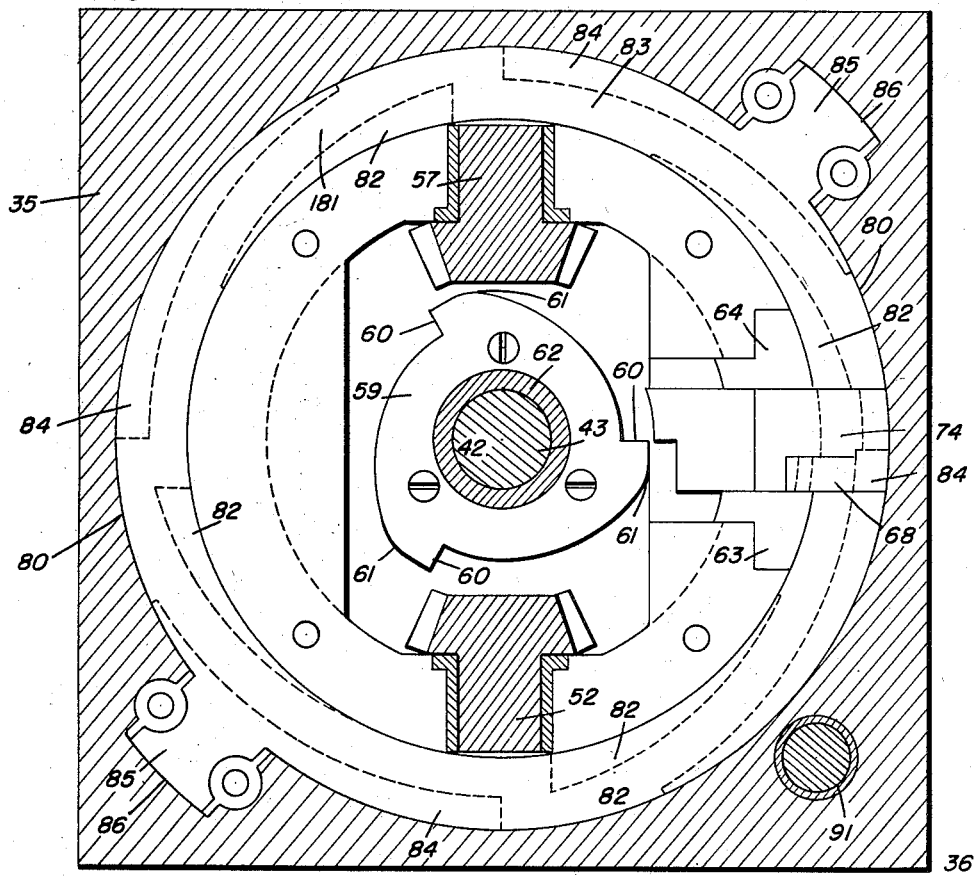
Fig. 3
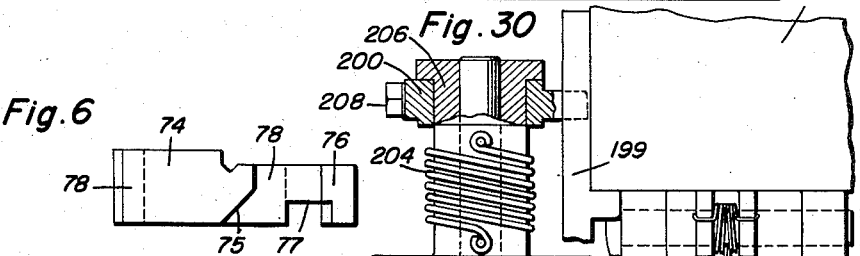
Fig. 6
Fig. 30
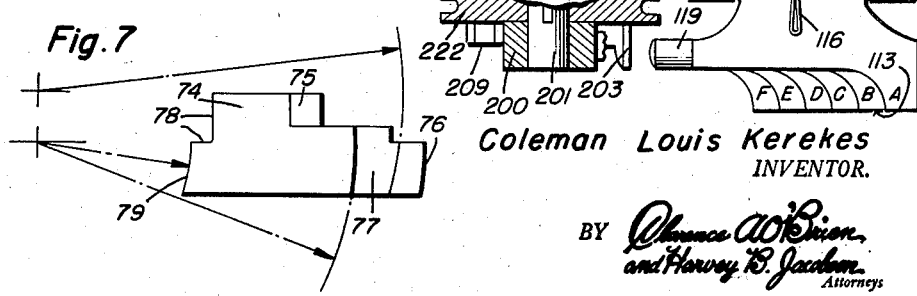
Fig. 7
Coleman Louis Kerekes
INVENTOR.
BY *Clarence A. O'Brien*
*and Harvey B. Jacobson*
Attorneys Aug. 26, 1958     C. L. KEREKES     2,849,126
CENTRALIZE INDEX AND DRIVER FOR STORAGE AND PARKING
Filed May 23, 1955     14 Sheets-Sheet 4

Coleman Louis Kerekes
INVENTOR.

Aug. 26, 1958     C. L. KEREKES     2,849,126
CENTRALIZE INDEX AND DRIVER FOR STORAGE AND PARKING
Filed May 23, 1955     14 Sheets-Sheet 5
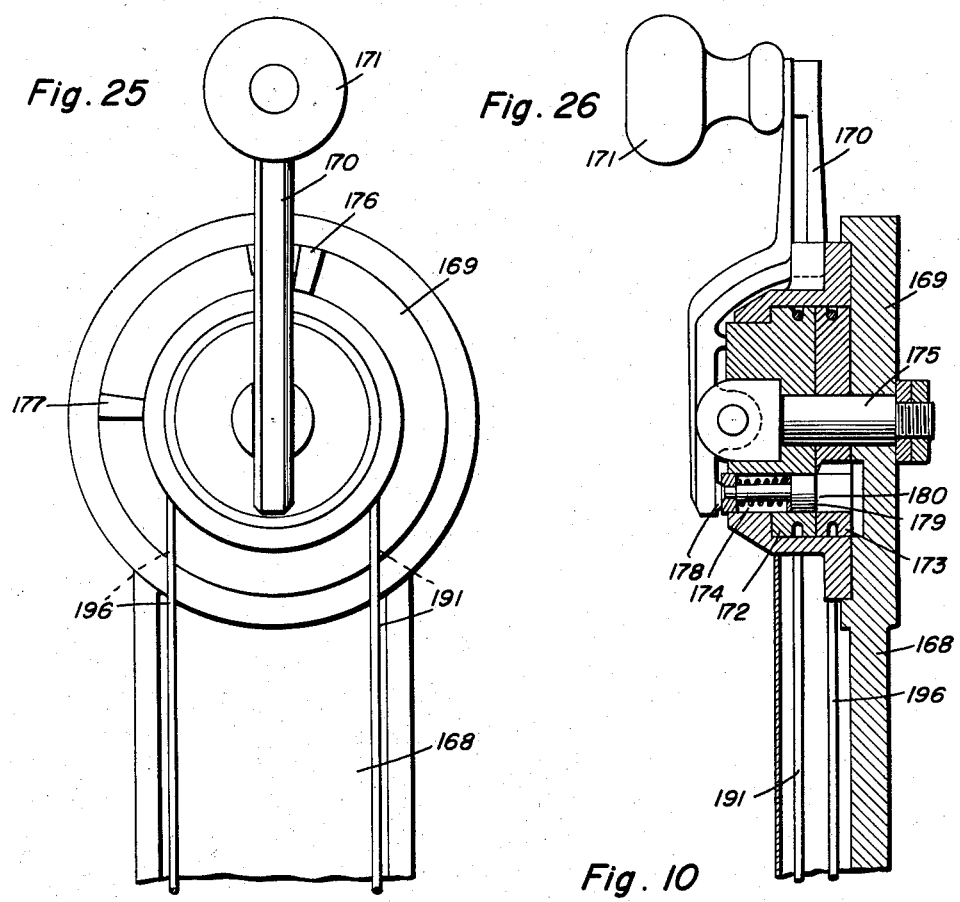
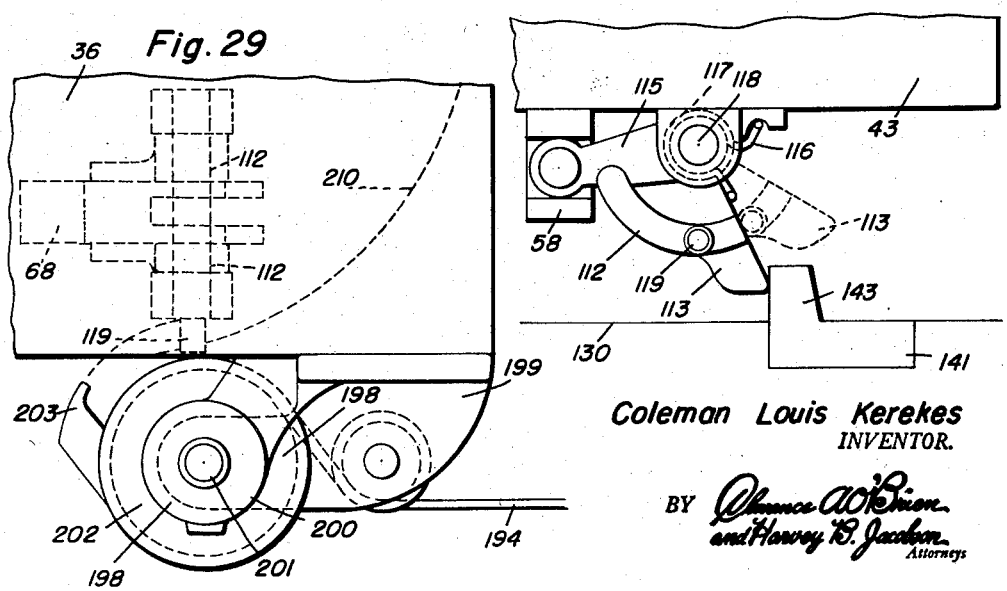
Coleman Louis Kerekes
INVENTOR.

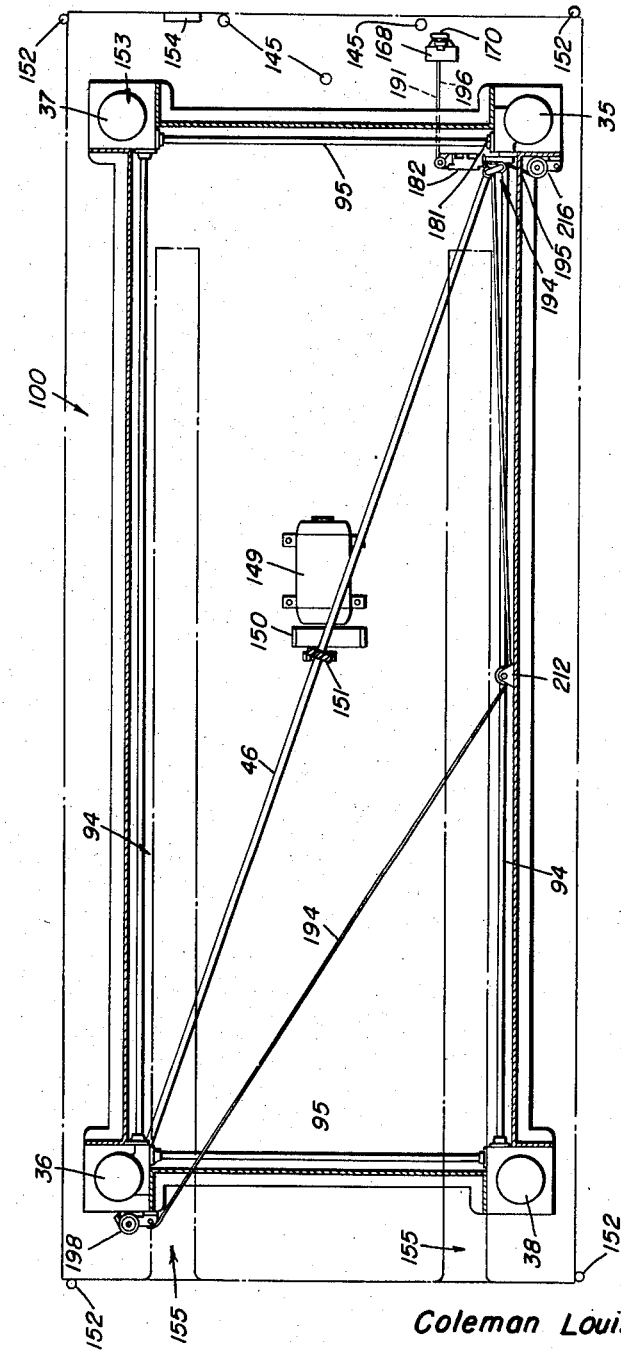

Aug. 26, 1958 C. L. KEREKES 2,849,126
CENTRALIZE INDEX AND DRIVER FOR STORAGE AND PARKING
Filed May 23, 1955 14 Sheets-Sheet 7
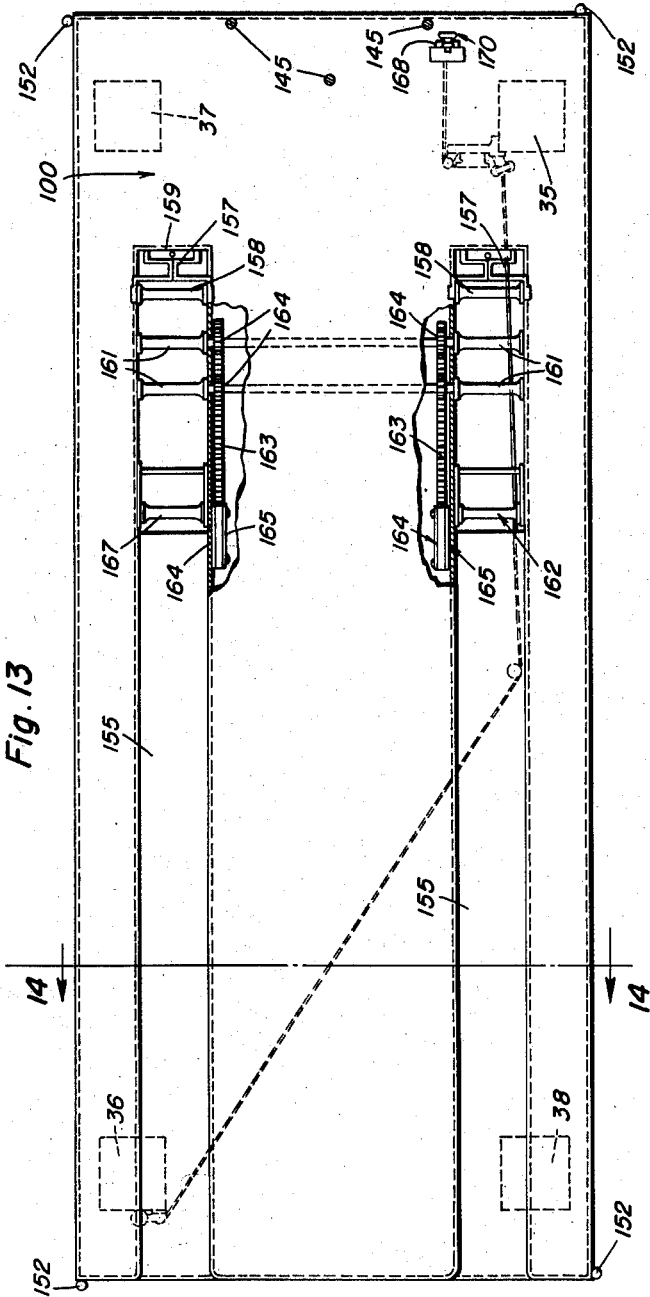
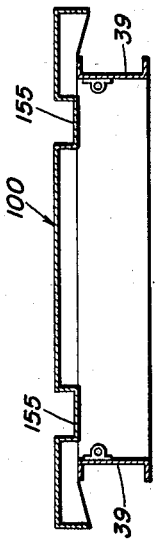
Coleman Louis Kerekes
INVENTOR.
BY
Attorneys

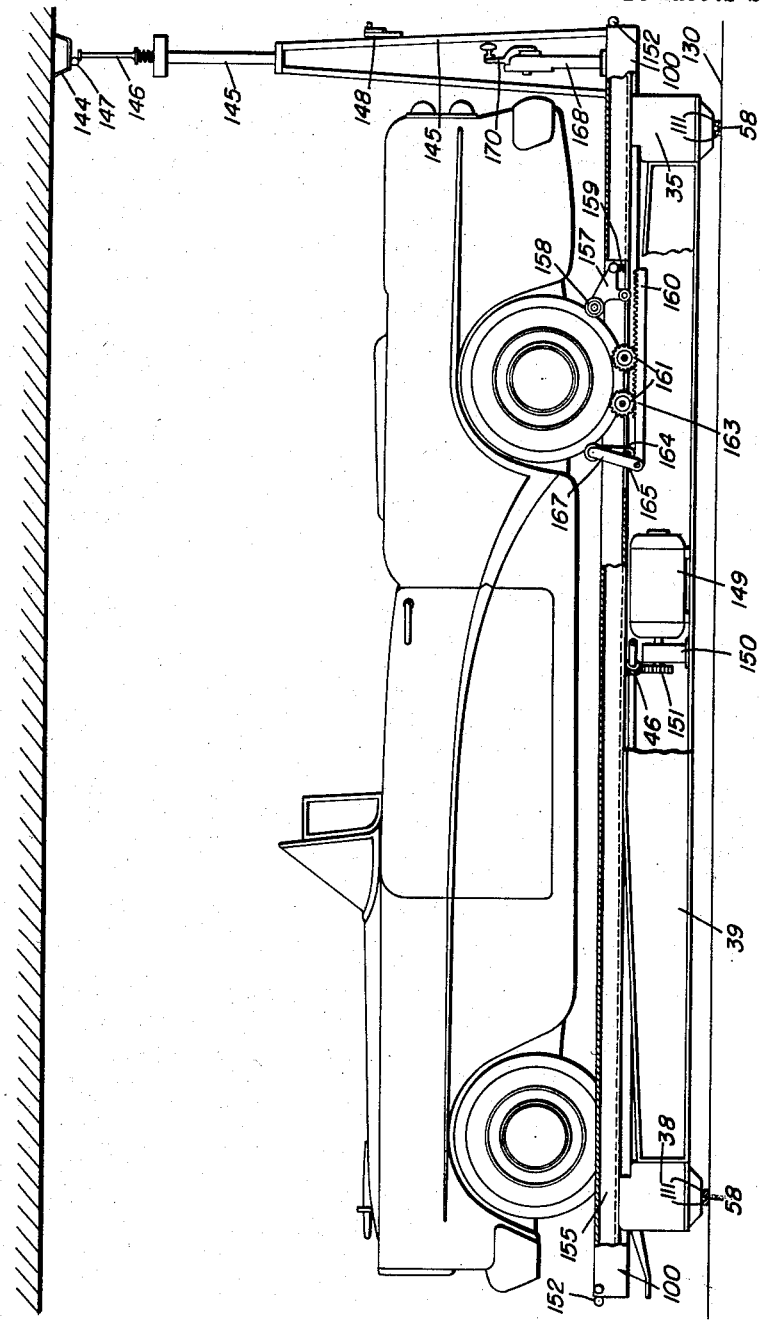

Aug. 26, 1958     C. L. KEREKES     2,849,126
CENTRALIZE INDEX AND DRIVER FOR STORAGE AND PARKING
Filed May 23, 1955     14 Sheets-Sheet 9
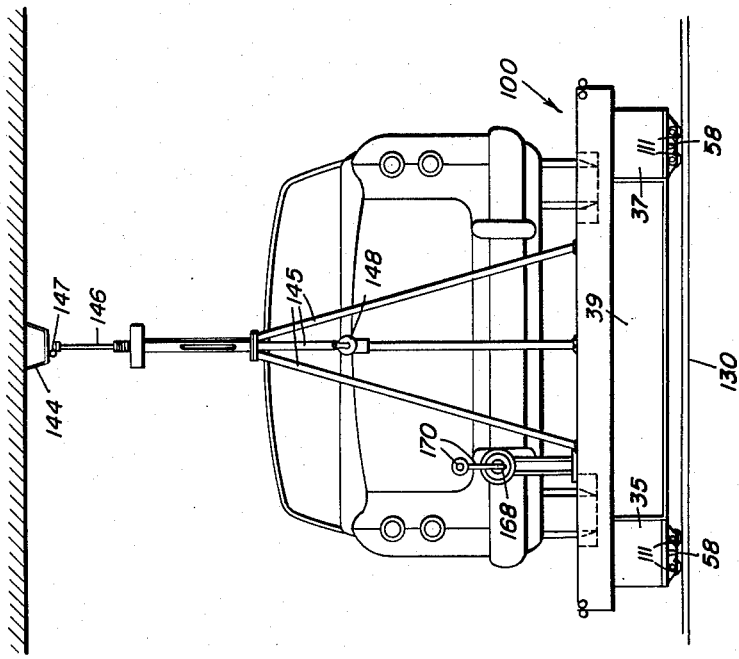
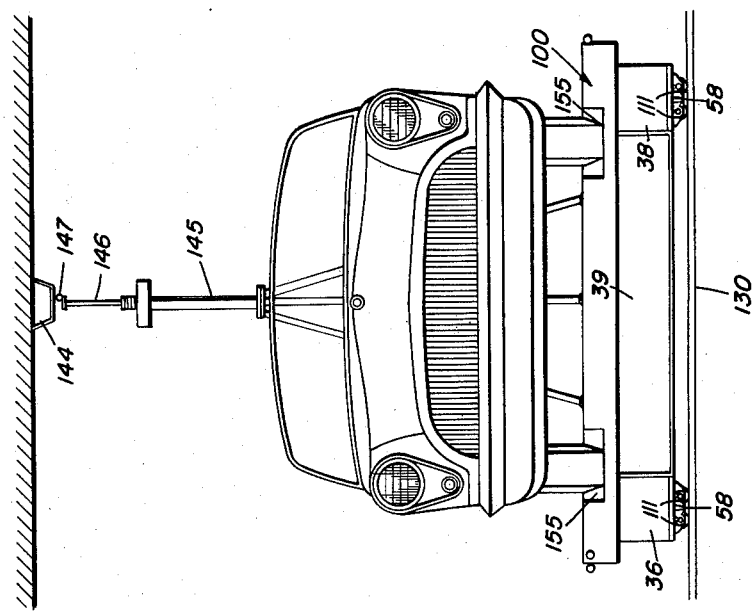
Coleman Louis Kerekes
*INVENTOR.*

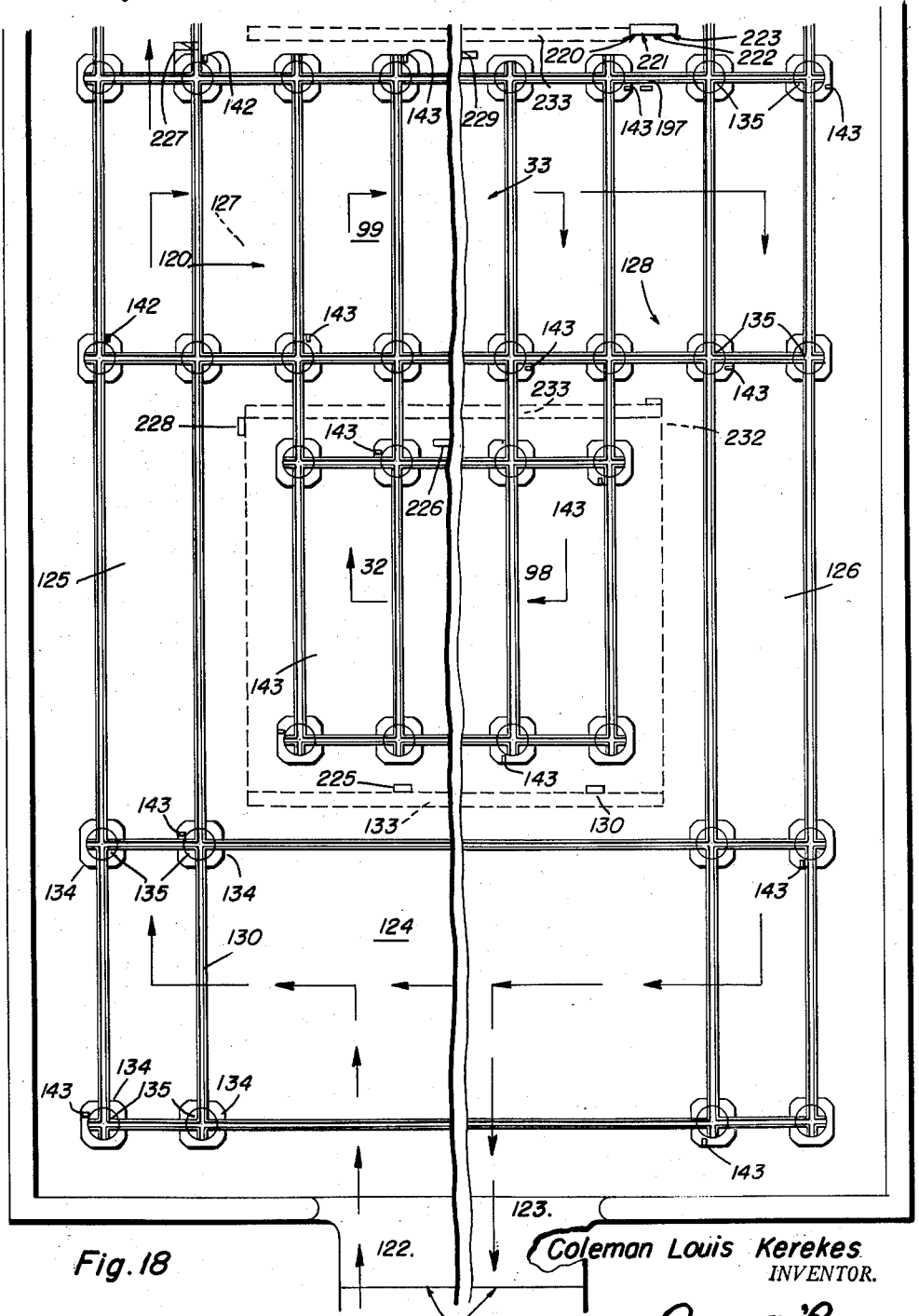

Aug. 26, 1958 C. L. KEREKES 2,849,126
CENTRALIZE INDEX AND DRIVER FOR STORAGE AND PARKING
Filed May 23, 1955 14 Sheets-Sheet 11

Coleman Louis Kerekes
INVENTOR.

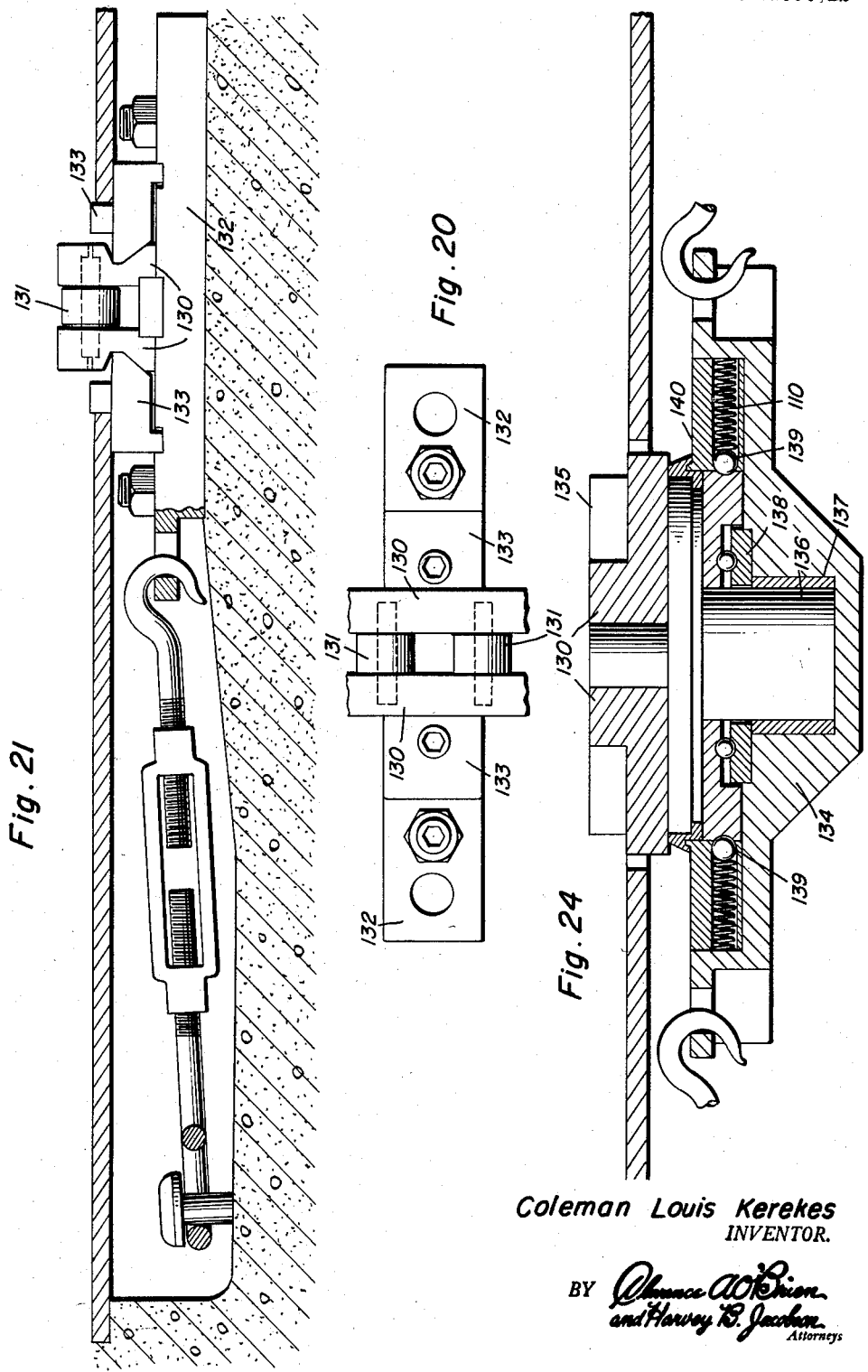

Aug. 26, 1958 C. L. KEREKES 2,849,126
CENTRALIZE INDEX AND DRIVER FOR STORAGE AND PARKING
Filed May 23, 1955 14 Sheets-Sheet 13
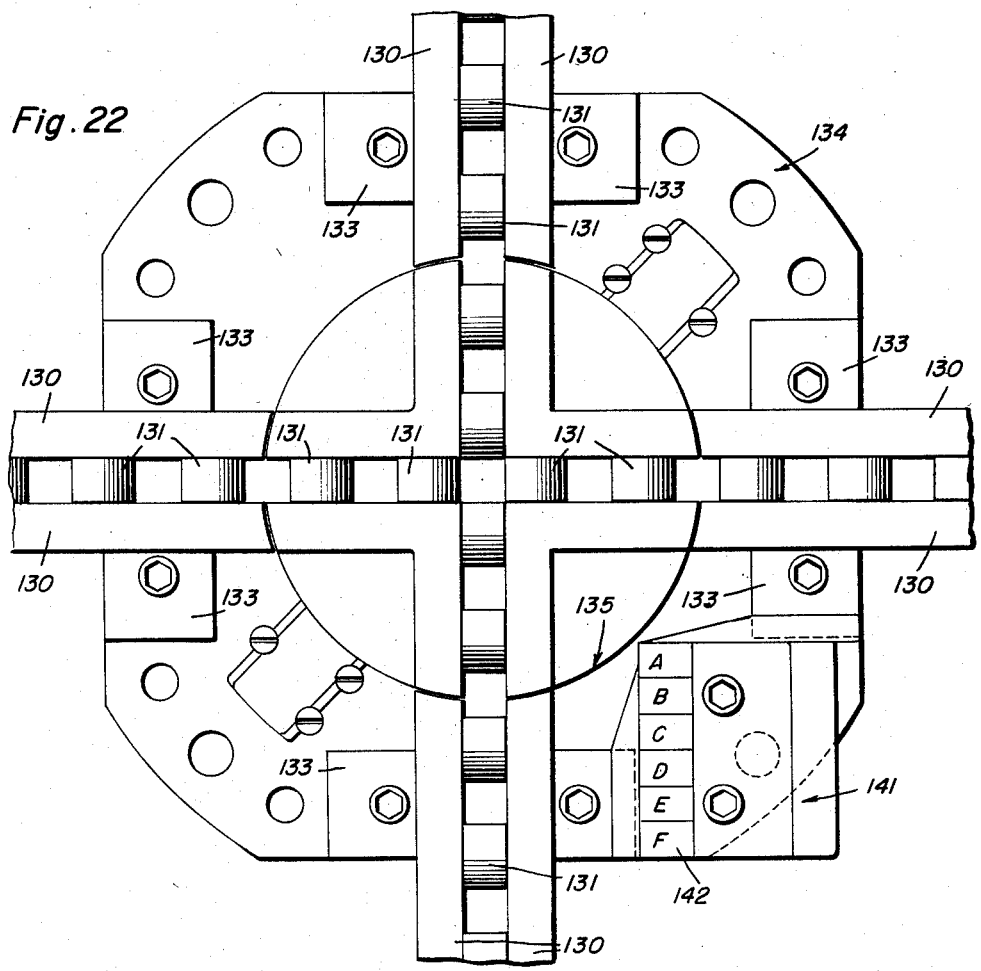
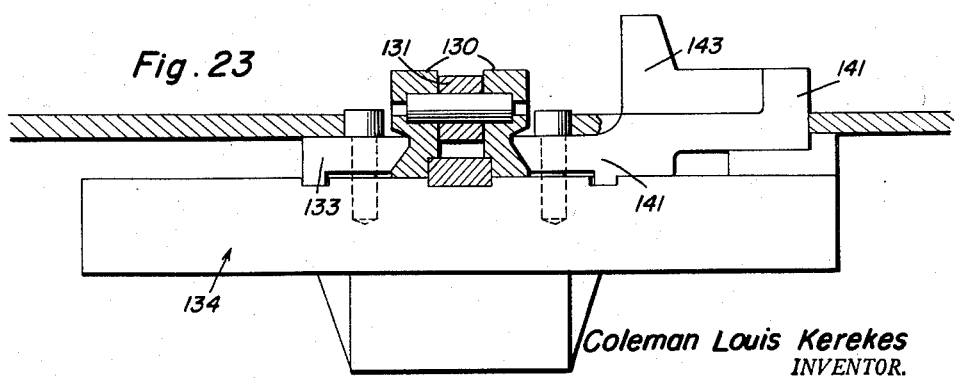
Coleman Louis Kerekes
INVENTOR.

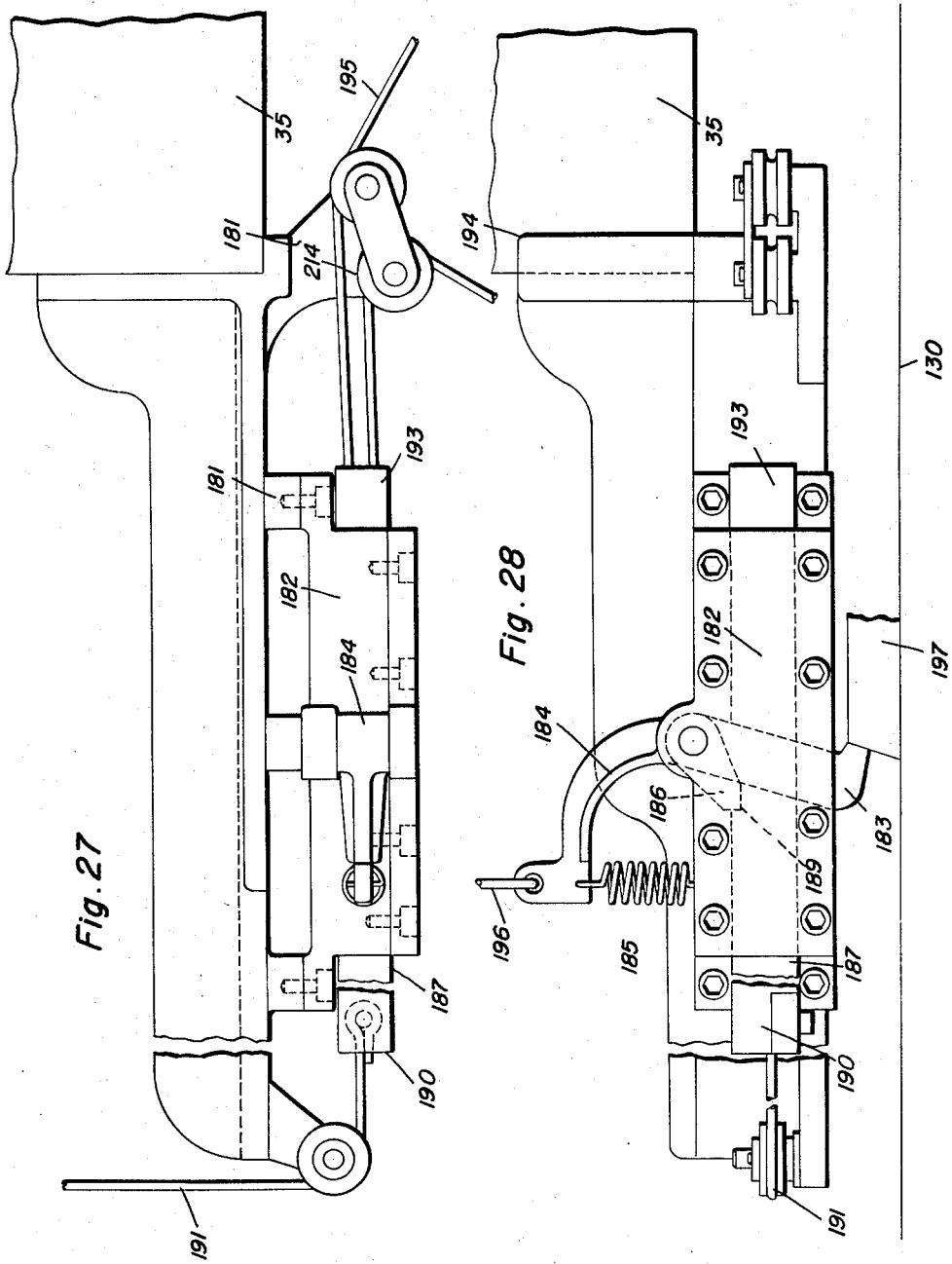

United States Patent Office 2,849,126
Patented Aug. 26, 1958

2,849,126

CENTRALIZE INDEX AND DRIVER FOR STORAGE AND PARKING

Coleman Louis Kerekes, New Brunswick, N. J.

Application May 23, 1955, Serial No. 510,097

5 Claims. (Cl. 214—16.1)

The primary object of this invention is to minimize the loss of usable space in warehouses, parking lots and similar places where objects are stored, parked or stacked and to do away with wasteful wide lanes in these places, as such lanes are required at present for easy access to stored objects and to remove stored objects if required.

To overcome loss of space in a valuable area such as a warehouse or a parking lot, there is provided a centralized index and driver for carriages whereby the carriages with a load store themselves consecutively in rows and make use of practically the full area of a warehouse or parking lot. Only a narrow path between each row is not covered so that the carriages will be accessible by these narrow paths and any one or more of the carriages can be selected to be brought forward to unload or to load without the remainder of the carriages being required to leave the warehouse or the lots.

The construction of this invention features the concept of providing a gear drive for the carriages on which the vehicles are deposited the carriages moving within a park on rails, and the rails being maintained continuous at their intersections by means of novel pivots which enable the two driver housings of a carriage to index the sprockets of the housings, thereby permitting flank movement of the carriage, in a right angled manner without changing the "face" position of the carriages or the vehicles mounted thereon.

A further object of the invention resides in the provision of a carriage onto which vehicles, such as automobiles, can be easily backed and which is provided with highly efficient means which are self-operative to lockingly engage the rear wheels of the automobile or like vehicle to hold the vehicle on the carriage.

Still another object resides in the provision of a novel drive system including a sprocket wheel and spaced rail members carrying rollers there between which will ensure proper operation of the carriages and maintain the carriages on the rails.

Still another feature of the invention resides in the provision of means for supplying electrical power to the carriages which includes a ribbon mounted above the carriages and which is adapted to be engaged by a tripod mount carried by the carriages.

A further feature of the invention resides in the provision of highly effective means for indexing the drive sprocket of the various drive housings supporting the carriage in a manner whereby the carriages will be able to make flank movements at the pivot and drive sprockets rotate the pivot therewith when being indexed.

A further object of this invention resides in the provision of a novel discharge device, adapted to supervise the removal of the carriages mechanically from the park, by allowing the carriages to be discharged from the bins, counting the numbers of carriages removed, enable the resetting of the device, and discontinue the discharge cycle in the bins of the park.

These, together with the various ancillary objects and features of the invention which will become apparent as the following description proceeds, are attained by this centralized index and driver for storage and parking, a preferred embodiment of which has been illustrated in the accompanying drawings, by way of example only, wherein like reference numerals designate similar parts throughout the various views.

Figure 3 is a horizontal sectional view of said gear housing at the index ring;

Figure 6 is a side elevational view of the tongue;

Figure 7 is a bottom plan view of the tongue;

Figure 10 is a side elevational view of index brackets as they are located on driver housings showing the index fingers in action, and another finger in dotted lines as it appears when raised by the lifters passing over index block as discharged from the bin;

Figure 11 is a top view of a frame showing the diagonal drive shaft, two drivers, two idlers, four limit switches, a distributor, a fuse box, discharge mechanism and trigger assembly, the lifters and associated cables;

Figure 13 is a view of a carriage top, outline showing recesses and the tire lock;

Figure 14 is a vertical sectional view as taken along the plane of line 14—14 of Figure 13;

Figure 15 is a side view of carriage including tripod post in the rear thereof;

Figure 16 is the rear view of the carriage, illustrating tripod post, control switch, the coaster, charged ribbon, the discharge lever and an outline of four axles and sprocket wheels on the rails;

Figure 17 is a front elevational view of the carriage;

Figure 18 is a top plan view of the rail system;

Figure 20 is a top plan view of joined rail sections with rollers between and tie shoes;

Figure 21 is a side elevational view of joined rail and parts shown as it may be positioned below floor surface;

Figure 22 is a top view of a pivot; the pivot having a head identical to the rail tops; and the pivot casing or anchor block on which the four rail ends clamp to and also the seats for index blocks are illustrated;

Figure 23 is an end elevational view of a pivot casing or anchor block by the index block end;

Figure 24 is a sectional view of the pivot and its casing at the snap lock to clarify construction;

Figure 25 is a view of the discharge upright. It shows the head with the selector lever, the discharge cable and the reset cable;

Figure 26 is a sectional view of the discharge upright mechanical head and the selector lever;

Figure 27 is a top plan view of the trigger mechanism attached to bottom of the drive housing;

Figure 28 is a side elevational view of the trigger mechanism attached to housing showing the trigger as it strikes the switch block;

Figure 1:
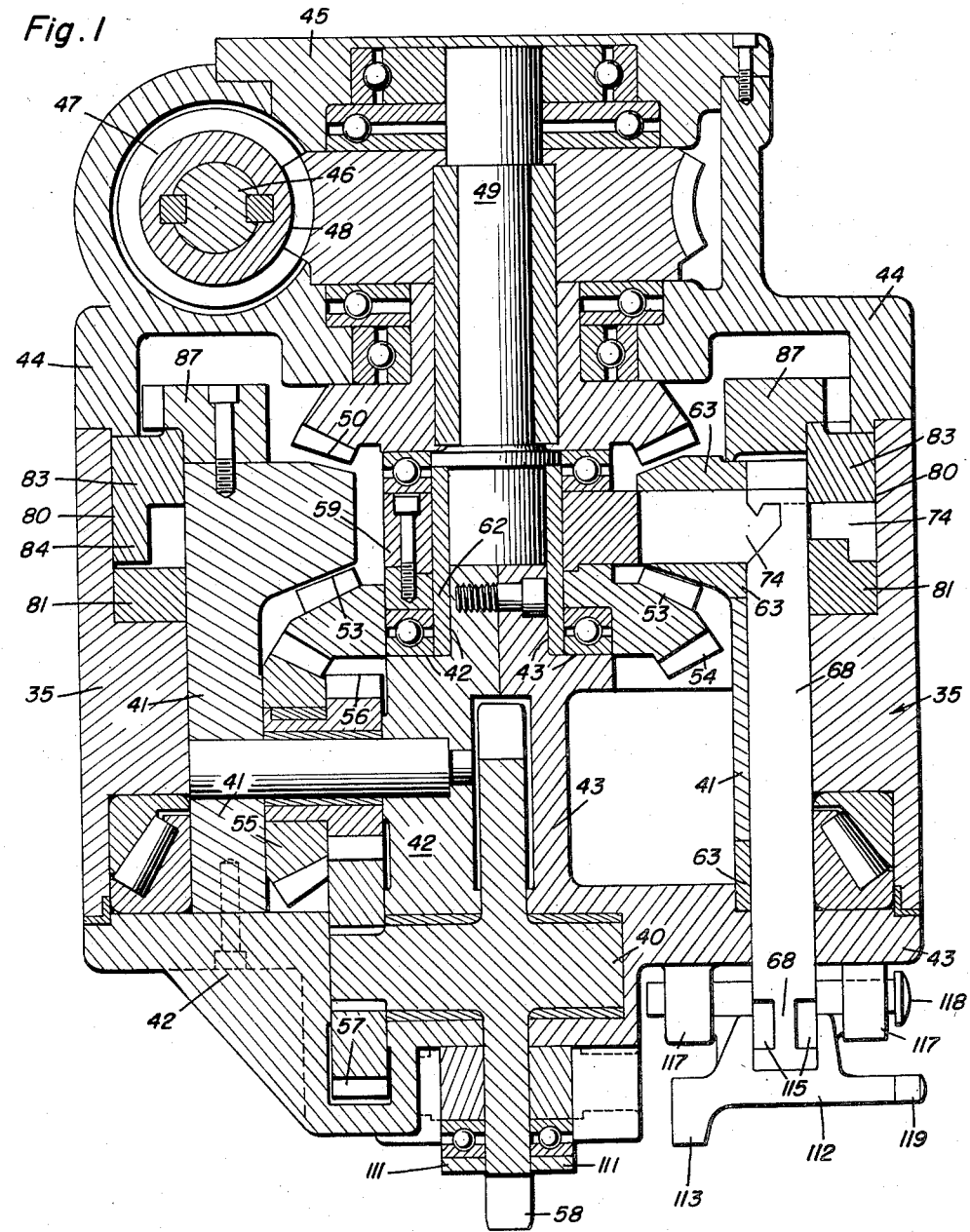
Figure 1 is a vertical sectional view of an index and driver gear housing.
Figure 2:
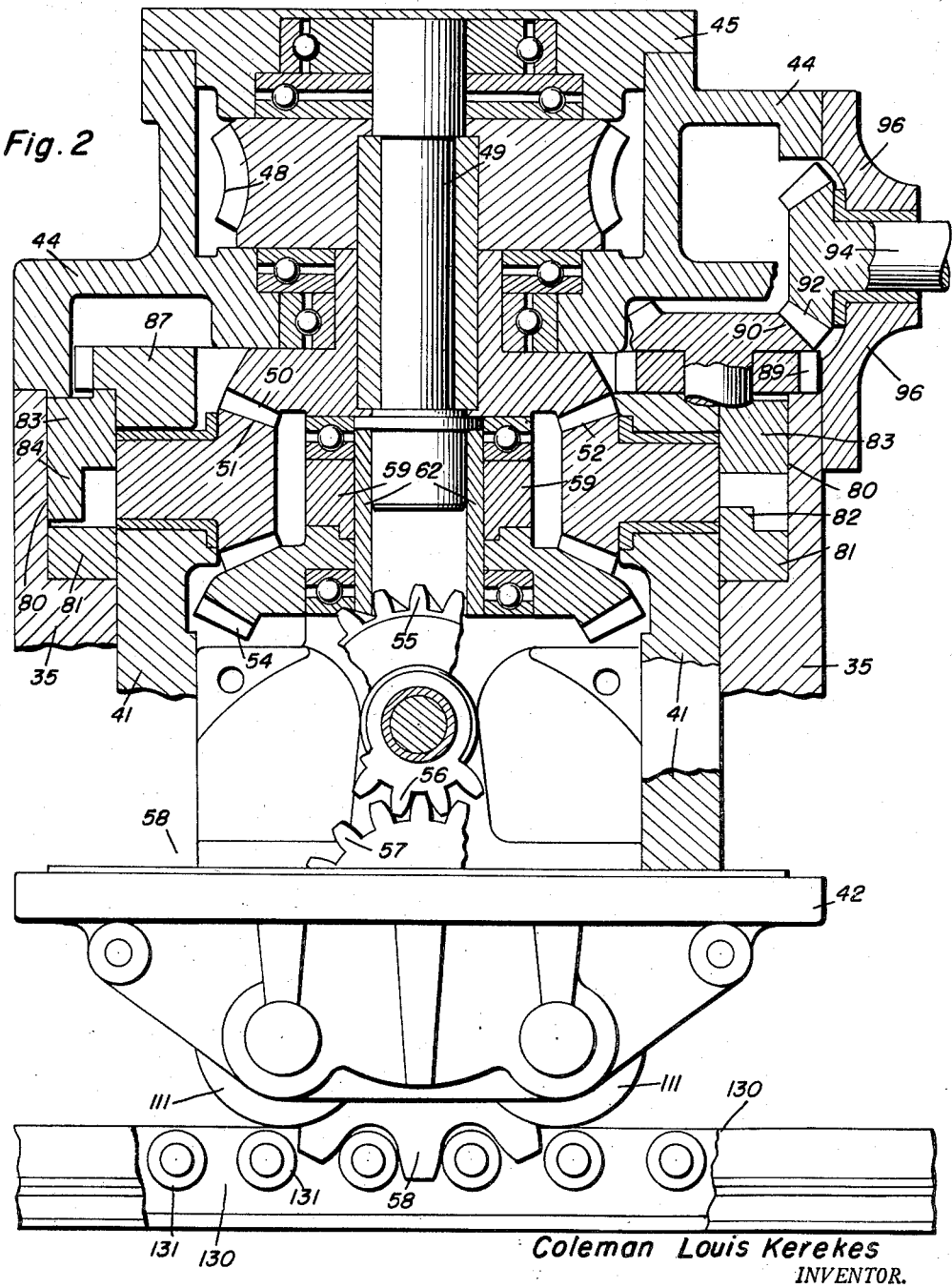
Figure 2 is a vertical sectional view of same index and driver gear housing as taken along a plane normal to the plane of Figure 1.
Figure 4:
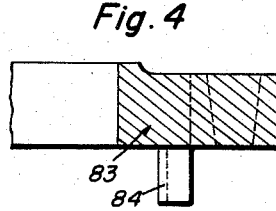
Figure 4 is a sectional view illustrating the index ring.
Figure 8:
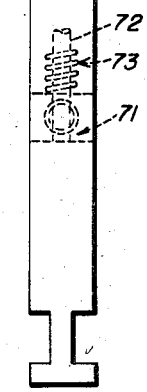
Figure 8 is an elevational view of the index rod.

Figure 29 is a top view of lifter casing 198 attached to driver housing 36. It shows outline in dotted lines of index finger's bracket 112 and small roller 119 of finger. Arrow points to the direction of a roll-in 210 as carriages move up from 98 into aisle 99.

Figure 30 is a front elevational view of the lifter casing and index fingers attached to driver housing. Shown six different outlines of the index fingers in their respective position.

The basic concept of this invention lies in the construction of the index and drive housings and associated mechanisms.

The housings are attached to the frame in a similar manner in all cases and form a unit of drive and index. Since the two drivers are identical in construction, it is necessary to describe only one of them in detail.

The gear housing 35 is a complex device, square in shape, and stationary in the frame. Inside member 35 is a cylindrical member 41 (see Figure 1). To the bottom of member 41 are bolted two half round members 43 and 42. These parts 42 and 43 in turn are bolted together at five places.

Between said bolted parts 42 and 43, and centrally located to cylindrical part 41 is axle 40. On axle 40 may be mounted any suitable wheel to manipulate a manually operated vehicle, not further shown or described.

The external round flange of parts 42 and 43 bears against the bottom of square housing 35. Housing 35 is underbored to contain the thrust and roller bearing and an oil seal. This bearing is provided to guide the assembled parts in the housing and to make indexing easy under a heavy load of the carriage.

Therefore, the assembled parts 41, 42, 43 including axle 40 and the sprocket 58 is free to revolve inside stationary housing 35, for indexing only.

The upper part of housing 35 is covered by casing 44, into which cap 45 is countersunk.

Leading into casing 44 is diagonal drive shaft 46 and worm 47 is keyed thereon. Drive shaft 46 is supported in casing 44 on both sides of the worm by sets of ball and thrust bearings.

Worm 47 engages worm wheel 48 which is keyed to shaft 49. Farther down on shaft 49 and keyed to the shaft is bevel gear 50 turned by worm wheel 48.

Bevel gear 50 engages and drives two intermediate bevel gears 51 and 52. The axles of these gears are supported by bushings inside part 41.

Gears 51 and 52 engages bevel gear 53 and the bottom side of gear 53 is bevel gear 54. Therefore, these two bevels 53 and 54 have a common hub and turn together. Bevel gear 54 engages bevel gear 55 which is keyed to the hub of spur gear 56 and turns therewith. Gears 55 and 56 are supported on a shaft between parts 41 and 42. Spur gear 56 engages and drives spur gear 57, which is keyed to axle 40 of the wheel. The axle 40 is supported on both sides in bushings of parts 42 and 43.

Clutch 59 is keyed and bolted to common hub of gear 53 and revolves therewith. Clutch 59 has three projected tooth lugs, as 60, and they have 1/16 of an inch rise, as 61. Therefore, gears 53, 54 and clutch 59 act as a unit. The bore in the unit revolves on a case hardened bushing, as 62. The end of the bushing is press fitted, about half its length, on the round end formed by parts 42 and 43. The unit is provided with thrust bearings between gear 50 and parts 42 and 43.

One end of shaft 49 is supported in bushing 62. The middle of the shaft on the hub of gear 50 is supported by ball bearings in the bore of part 44, and the top of the shaft by a ball bearing in the bore of cap 45. Worm wheel 48 is also provided with thrust bearings on both sides in casing 44.

For further identification of housing 35, as has been previously stated, cylindrical part 41 and parts 42 and 43 are bolted together. Part 41 of the unit is slotted on one side its entire length.

Figure 9:
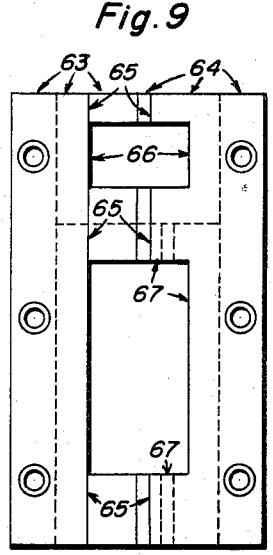
Figure 9 illustrates the hardened inserts.

Into this slot hardened inserts 63 and 64 are bolted (see Figures 3 and 9). Inserts 63 and 64 have slots, as 65, extending their full length. These slots are for guiding rod 68. Rod 68 projects through the flange of part 43.

Inserts 63 and 64 also have slots, as 66, across their heads for tongue 74. Insert 64 resembles 63 in an inverse manner and insert 64 in addition has an undercut 67 to take in rod lug 71, tension spring 73 and spring guide pin 72.

Rod 68 is square-shaped, contoured on its outer face. The upper end of said rod is offset and beveled, as 69, to engage tongue 74 and has a V-shape, as 70, to lock tongue in position. Rod 68 also has lug 71 mounted therein and spring 73 to hold rod in a down position.

The middle of tongue 74 is shaped to be engaged by rod 68, beveled, as 75, and has a V-slot for rod lock 70. Tongue 74 is offset as at 76 having a slot 77 therein. This offset 76 projects into part 35. Tongue 74 is cut away, as at 78, to engage clutch lugs 60. The tongue's extreme end is shaped as at 79. The body of the tongue 74 is supported in the head slots 66 of the inserts.

Figure 5:
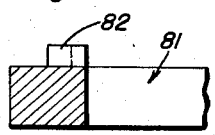
Figure 5 is a sectional view illustrating the ejector ring.
Figure 12:
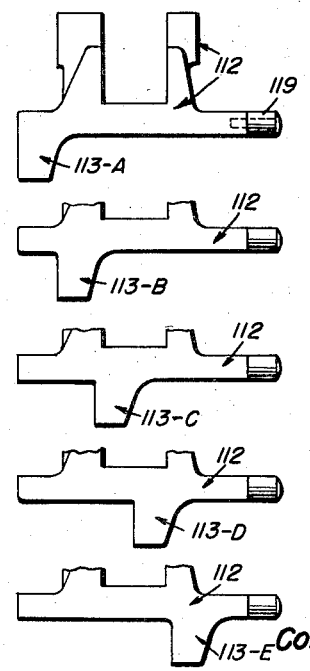
Figure 12 illustrates six different configurations of the index fingers, as many configurations as bins used in a car park may be provided as necessary.

The top of stationary housing 35 is underbored, as at 80. At the bottom of the underbore, dowel pinned and bolted to part 35, is ejector ring 81. This ring has four tapered cam lugs, as 82, on its inside perimeter (see Figures 5 and 3).

At the top of the aforesaid underbore is an index ring 83. This ring has four tapered cam lugs 84 on its outside perimeter and the lugs are tapered opposite to the lugs of ejector ring 81. Ring 83 also has on its outside surface opposite each other two projected ears, as at 85. These ears 85 are set in the undercut 86 of part 35 and are bolted therein and are adjustable (see Figure 3).

The unit of parts 41, 42 and 43 are held up inside part 35 by the ring gear 87 which is bolted to part 41. The ring gear, hub and shoulder bears on and into ring 83 and thus supported gear 87 is free to revolve at indexing.

The gear 87 engages spur gear 89 which is keyed to the axle of bevel gear 90 and turns therewith. The axle of gear 90 is supported in bushing 91 in part 35 (see Figure 3).

Bevel gear 90 engages bevel gear 92 and 93 which are keyed to shafts 94 and 95. Shafts 94 and 95 are connected to housings 37 and 38. Gears 92 and 93, and shafts 94 and 95 are supported in casing 96 which is bolted to the corner of housing 35 and part 44.

The index and drive housings 35 and 36 are identical. Their drives and index is as follows:

Tongues 74 are at their neutral position in the housings when they are locked between the two broad ends of lugs 82 and 84 of the rings, and the bodies of the tongues, as previously stated, are located in the inserts which are bolted in the cylindrical parts 41. Therefore, these units, including axles and wheels, do not turn inside stationary housings 35 and 36 while the carriage is in motion.

Motion of the carriage is obtained through the two drive housings located at diagonal corners in the frame. These housings are driven by shaft 46. As the shaft turns, it drives worm 47; the worms engage worm gears 48 and through gears 50, 51, 52, 53, 54, 55 and 56 drives and turns 57 which is keyed to axles 40 and the sprocket wheels turn therewith.

In this manner, the carriage is kept in motion. If at any time the rods, as 68, in the drivers 35 and 36 is actuated upward by any means, bevel 69 of the rods disengage the end 76 of the tongue from its locked position, then part 78 of the tongues engages and halts part 60 of the clutches. At this instant, the drives going through the intermediate gears 53, 54, 55, 56 and 57 to the wheels is retained and the carriage motion will halt.

Drive shaft 46 continues its drive of the worm onto the now locked worm wheels and tongues 74 are no longer locked. The worms 47 continue on the perimeter of locked worm wheels 48 and the unlocked members, parts 41, 42 and 43 including axles 40 and the sprocket wheels, will turn inside the stationary members of the housings 35 and 36; similarly ring gear 87 bolted thereon will also turn and drive gears 89, 90 and 92, 93. The last two gears are keyed to shafts 94 and 95. These shafts are connected to the idlers 37, 38.

When the assembled parts with the retained gears, axles and wheels, index a quarter of a turn clockwise, inside the stationary housings 35 and 36, they are said to be indexed.

In the idle housings 37, 38 the reverse order of the previously described ring gears 87 and their associated index gears is present. Ring gears 87 of housing 36 and 35 will simultaneously turn shafts 94 and 95, then the reverse order of gears of housing 37, 38 will index the said two housing 37, 38 counterclockwise a quarter of a turn.

The motionless carriage's sprocket wheels will pivot in such a manner as is said to be indexed and when the wheels are indexed in said manner all motion sideways, forward or backward for the carriage is eliminated. During an index all of the wheels of a carriage change direction.

Index is accomplished when slot 77 of the tongue rides the ejector rings cam lug 82 to its extreme height; the tongue pulled out by said cam lugs 82 releases clutch 59. End 76 of the tongues is retained from traveling farther than a quarter of a turn 90 degrees by the index ring cam lugs 84 broad ends; then locked therein between lugs 82 and lugs 84 by the sweep of the clutch's lug rise in both housings simultaneously. For this reason, the carriage's motion is reversible by the motor when the motor is reversed, but will not index when driven by a reversed motor.

To make the index and drive mechanism, just described, feasible in group operation (there are six groups, each group consists of forty-eight carriages in two rows, twenty-four in each) in addition to what housings 35, 36, 37 and 38 has so far, it is necessary for each housing to have a "sprocket" wheel, as 58 instead of a "tire" wheel. Each housing also has four small racers, as 111, located two in part 42 and two in part 43 (therefore each carriage has sixteen racers).

Driver 35 and 36 only on the flange of part 43, in order to actuate rod 68, have an assembly of parts and they are: hubs 117, projected out of the flange; between said hubs are links 115 and bracket 112; passing through these parts is pin rod 118 upon which these parts swivel. Tension spring 116 holds bracket 112 in position. Attached to bracket 112 is a short roller 119. Bracket 112 has a projected finger 113. This finger is made in six different configurations, one for each bin (group).

The operation of the carriages in close quarters requires a rail system installed throughout the car park. The car park consists of: (see Figure 18), ramp 121, front aisle 124, entrance aisle 125 leading in the rear; coming out from the rear is an exit aisle. There are six separate bins, of these bins only one 120 is shown. This bin 120 is complete with all its automatic controls appropriately numbered for better understanding.

Since these six bins are identical in this section of the specification, I shall refer to only bin 120. Bin 120 has fifty spaces and can accommodate 48 carriages, therefore a bin can accommodate any even number of carriages within the area of the given number of carriages plus the area of twice the size of one of the carriages, plus a safety aisle (just wide enough for the attendant to pass through) for each row of carriages. There is no set number of carriages per bin but for practical purposes there should be a minimum of forty-eight.

If one bin is found sufficient the front aisle, entrance aisle, and exit aisle is omitted, otherwise space saving is defeated or at least minimized to a great extent.

The following specification of the rail system deals with their construction. The section of rail as shown in Figures 20 and 21 is right and left in design. In the inner faces of both rails are blind holes which support the pins on which the rollers 131 revolve. The center distance of these rollers corresponds to the pitch of the teeth of sprocket wheel 58. The sprocket wheels of the carriages are guided between these rails. From now on these joined rails shall be referred to as 130. These right and left rails are held together at the required intervals, on shoes 132, by clamps 133. These shoes are bolted to and supported on any appropriate foundation, and they may or may not be adjustable as shown.

The rails 130 are laid out to support the four housings of the carriages. These carriages travel on the top of the rails, supported by sixteen racers 111, four to each housing. When the rails meet or cross each other they are perpendicular. At all of these intersections there are four casings, as 134, mounted on the foundation. These casings are bolted and held in place and by clamps the joined rails 130 are secured thereon.

In the center of said casings are pivots 135 (one pivot for each casing). A pivot has an axle 136. This axle is supported in casing 134 by bushing 137 and by thrust bearing 138. In recesses on the casing opposite each other are axle snap locks 139. The purpose of these snap locks is to keep the pivot stationary at the desired position. The pivot in the casing is oil sealed as at 140 against all foreign material.

The head of the pivot 135 resembles the joined rails 130 with rollers between. Part 141 is located appropriately on two of the four casings at each intersection. Part 141 is a combination of two; clamps and a bolting seat for the index blocks. The clamping base of blocks 142 and 143 are identical. All of these blocks have projected lugs.

Blocks 143 have lugs all the way across their base. These wide projected lugs of blocks 143 will engage all of the index fingers. Blocks 143 are located throughout the car park except at the entrance of the bins.

Blocks 142, twelve in number, are located by the entrances to the bins in pairs. The projected lugs of said blocks 142 have six different configurations which are equal to the six configurations of the index fingers, and for this reason when the index fingers meet their corresponding index blocks the carriage will index and thus will enter the desired bin and store themselves automatically.

The rail system as described is adapted for the carriages and the carriages are mechanically controlled as to their drive and index. Each of the carriages has a motor of its own and two drivers, as sprocket wheels 58. Electricity is supplied from the charged ribbon 144 above and from the charged rails.

On the rear of the carriage 100 is a tripod post 145. The post 145 has a spring tensioned insulated conductor rod 146. At its top is coaster 147 which is in contact with the ribbon above. Above the car top in plain view, visible from three sides, secured to the tripod post, is an identification plate with the bin letter and the carriage number. Also on this tripod post is switch 148 located at a convenient height. This switch is wired to the motor. The insulated motor 149 engages the reducer 150 through a fiber gear 151. The spiral gear of the reducer engages and drives spiral gear of diagonal drive shaft 46 of the housings.

The carriage top overlaps the frame all around and into the edges of the flat top on all four sides at the right extreme corners on each side are located limit switches 152. These switches are so placed that the rear ones are higher than the front ones; because of this when the carriages pass each other the switches will by-pass without touching each other. Note: These carriages always face in the same direction regardless of where they are or where they go.

All four of the limit switches 152 are wired to the distributor 153 located in idle housing 37. These switches are sensitive and as their name implies they will limit the movement of the carriages by shutting off the electricity to the motor or by transmitting electricity to the motor during the trips of the carriage.

These limit switches are wired so that the front switch of the carriage, regardless of the direction the carriage is traveling, is always charged and therefore stop the carriages motion at the instant the projected roller of the switch is depressed. This is true even when the motor is reversed by switch 148, but as long as the motor remains in reverse the carriage will not index.

To operate, normally the switch 148 is always in forward position on all the carriages, and so the carriages will move along the rails unaided starting and stopping automatically when necessary.

Conductor 146 is wired to the distributor 153. All four of the switches 152 are wired to switch 148 on post. The charge from the rails passes to the frame through the racers of the carriage and the frame is wired to switch 148 on the post. From switch 148 the motor is wired to run forward or reversed through fuse box 154.

The tops of the carriages have recesses 155 which extend from the front of the carriage short of the rear. These recesses are adapted to receive the tires or any car and they are so designed so as to take in the widest or the narrowest wheel base of any car.

The carriage tops are at the same level with the ramp. The cars are backed onto the carriage for storing. As the car is backed onto the carriage, its rear wheels will become locked by mechanical locks 156 designed specifically for this purpose. These tire locks which are in line with the two recesses are worked by the two rear tires of the car.

These two locks 156 parts include stop blocks 157. These blocks have contour rollers 158, and shock tension spring 159, and stop blocks 157 pivot as at 160. The locks also have two rubber coated contour rollers as 161 in each of the recesses to be engaged by the tires of the car. The shafts of these rollers are supported in the recesses and onto the ends of these shafts is keyed spur gears 162. Gears 162 actuate racks 163.

The ends of the racks tie in with links 164; links 164 tie into links 165. The other ends of links 165 are hinged in the sides of the recess. Where links 164 join links 165, there are contour rollers 167.

In operation, when the rear tires of the car are halted by stop block 157 in their backward movement, coated rollers 161 will be engaged and driven by the tires. The coated rollers through the spur gear will actuate the racks. This action will close links 164 and 165 and then roller 167 will close onto the tires and thus the rear tires become securely locked between rollers 167 and blocks 158.

To release the lock on the tires the car must go forward. Actuated by the forward motion of the tires the action of the rollers is reversed and the tires of the car are released.

The carriages, in addition to the tire locks, have a discharge mechanism located in the rear. This discharge mechanism is situated on an upright 168. The parts of this upright 168 include a mechanism in its head as 169; a selector lever as 170 with a knob as 171; cable pulley 172, reset cable pulley 173; reset tension spring 174 and shaft 175.

Selector lever 170 is hinged on shaft 175. End 178 of the selector lever is held up by tension spring 174. Cable pulley 172 is keyed onto shaft 175 and shaft 175 is free inside of reset pulley 173. On the face of the head on the top is projected lug 176, on the side of the face is lug 177.

The selector lever is actuated between these lugs. When the lever is down by lug 177, the lever is said to be in position for Discharge of the carriages. If lever in said position is pulled outward by knob 171, the other end of lever as at 178 will push ratchet 179 into the tooth 180 of the reset pulley 173 and by moving the lever a fraction up to lug 176 the selector lever will return to its original position by lug 176. This is termed Reset the selector lever.

Under the carriages, bolted to housing 35, is bracket 181. To this said bracket is bolted trigger mechanism 182 (see Figures 11 and 27, 28.) This trigger mechanism has many parts, the main ones being the trigger 183; trigger arm 184; the arm spring 185; the trigger detent 186; the slide 187; slide notch 189; and one end of slide as at 190. To this end 190 cable 191 is attached. The other end of this cable 191 is entrained about selector pulley 172 and attached thereon. This cable is guided by pulleys.

To the other end of slide as at 193 are attached two cables, cable 194 from the lifter 198 of housing 36 and cable 195 from the lifter 216 of housing 35. Through these cables the lifters are operated. Arm 184 is held down by spring 185. Cable 196 connected to arm 184 leads back to rest pulley 173 and is entrained and attached.

Attached to housing 36 is lifter 198. The parts of this lifter include the bracket 99; hub 200; and shaft 201. To this shaft is keyed pulley 202; projecting from the perimeter of this pulley 202 is index finger lifter 203, used for discharge only. Another member of lifter 198 is coil spring 204 which is bolted to pulley 202 and part 206. The function of spring 204 is to force the pulley with the finger lifter to oppose the movement of the cable 194.

Part 206 is a sleeve bushing. Its purpose is to support the shaft and adjust the tension of spring 204. Part 206 is locked in the hub by lock screw 208. Pulley 202 has on its body a tension stop pin 209; and this pin is rubber lined to absorb the shock.

Figure 29 clearly shows (in dotted lines) bracket of finger and small roller 119 attached to finger bracket. It also shows the bracket 112 as it indexes into position as the case is when the carriages come up from aisle 98 into aisle 99. This is said or termed Roll in for Discharge.

Entrained and attached to pulley 202 is cable 194 coming from slide end 193; guided by the pulley mounted on bracket 199, and by the pulley attached to the frame, also by pulley 214 located on bracket 181.

Lifter 216 is attached to housing 35. This lifter and lifter 198 are the same in construction and action. The function of said lifters is to raise the index fingers 113 above the tops of blocks 143 so as to allow the carriages to pass over the intersection without indexing and then the carriages leave the bin. See Figure 10. The lifters raise the fingers 113 of the drivers 35 and 36 of the carriages when the selector lever 170 is pulled down to lug 177 through the action of the cables, and the lever 170 is held in discharge position by the trigger mechanism detent 186 which is embedded into slide notch 189.

If an error has been made by the attendant by selecting the wrong carriage for discharge, he may Reset the selector lever as previously described.

The moving carriage's selector lever is automatically released and returned to its original position by switch block 197. Switch block 197 is secured in the foundation and located in the exit just outside the pivot casing onto which block 143 is secured. (See Figures 28 and 18.)

When the trigger of the moving carriage makes contact with block 197, the switch of the block is depressed and the trigger is forced back by the block and passes thereover.

The carriages in aisle 98 have to pass through aisle 99 to exit (see arrows in completed bin 120). These carriages when selected for discharge from the bin as they come into aisle 99 after the second index, their index fingers rolls into the lifters and are held there, then at the proper time are released in the manner as stated before.

Bin 120 (as shown in Figure 18) is complete with all controls. One of these controls is panel board 220. This panel has forty-nine buttons. Forty-eight of them are numbered as 221, one button for each accommodated carriage, and the forty-ninth button 222, for a neutral position. Buttons 221 are magnetically controlled by pole 223. The magnetic pole counts the buttons back to neutral, one by one, every time the switch block 197 is depressed by trigger 183.

In aisle 98, in the direction of the arrows, the second space from the corner is First Stop, referred to as 32. At this location is a limit switch 225. This switch 225 is on a bracket secured to the foundation, positioned high and near by the rails. It is so located that the edge of the carriages is able to depress the roller of the limit switch 225.

Near this switch 225, above the coaster of the carriage, is a short section of charged ribbon 226 insulated from the rest of the ribbon. This insulated ribbon 226 is wired from the numbered buttons 221 and no electric energy will flow to the ribbon unless one of the buttons is depressed.

Magnetic pole 223 is wired to charged switch block 197 which is located by exit 128. Nearby is one of the two index blocks 143. These two blocks 197 and 143 are the same height and they are in line with their respective members, index finger 113 and trigger 183.

The charged limit switch 225 is also wired to the insulated ribbon 226 and when the roller of said switch is depressed by the carriage's edge, the carriage will halt here and therefore this station is named First Stop. The oncoming carriages will fill up the remainder of the aisle 98 and are stopped by their limit switch 152 located in their edges.

The neutral button 222 is also wired to insulated ribbon 226 but the electric energy flows to the ribbon only when the button is held depressed by hand. This button is used for an emergency only such as a fire.

At the bin entrance 127 above the coaster of the carriage there is a section of insulated ribbon as 227. This said ribbon is charged through limit switch 228. Switch 228 is located by the intersection of rails in aisle 98 just as the carriages come up into aisle 99.

This switch 228 is so located on the foundation that the carriage after indexing and starting towards aisle 99 will depress the roller of the limit switch 228 and by so doing it will halt any carriages from entering the bin.

Similarly controlled is Second Stop referred to as 33. Space 33 is located in aisle 99, the second space before the exit 128. Above the coaster of the carriage at 33 in aisle 99 is an insulated ribbon as 229. This ribbon 229 is charged from limit switch 230. Switch 230 is located at the corner in aisle 98 and positioned so that when a carriage comes down into aisle 98 it's edge will depress the roller of limit switch 230. After the carriage is indexed, if aisle 98 is not full the carriage will move on, but if aisle 98 is full it will remain there keeping limit switch 230 off contact and thus the next carriage in line will stop at Second Stop 33.

The entering carriages stop behind the carriage at 33 and aisle 99 will become full.

When a carriage exits from the bin the out-coming carriages from the rear bins are similarly controlled by insulated ribbon 231 and limit switch 232. This ribbon 231 is near the exit of bin 120 and above the coaster of the out-coming carriages from the rear. The ribbon 231 is wired through charged limit switch 232.

This limit switch 232 is so positioned so that when a carriage is discharged from bin 120 the out-coming carriages from the rear bins are stopped allowing the discharged carriage to proceed.

When the aisles are full the bin is said to be full to its capacity, which means the total area of the bin is utilized except for two safety paths 233 and twice the area of one carriage.

Thus, it can be readily seen that a maximum amount of area is utilized by this car park.

Figure 19:
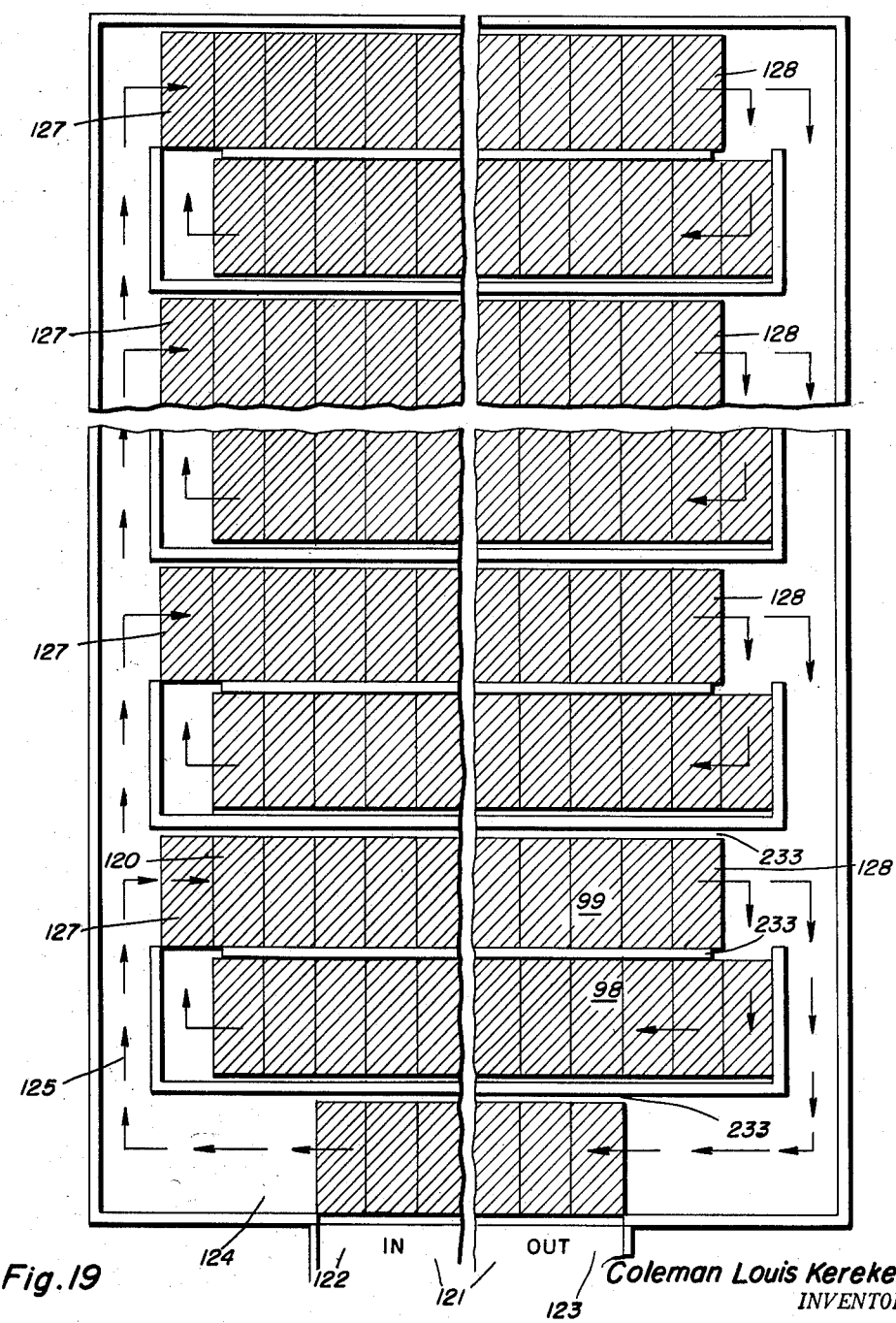
Figure 19 is a plan view of one floor plan reduced to show six bins. There may be forty-eight carriages in a bin, twenty-four carriages in one aisle of the bin, plus two carriage places and two safety paths for each bin.

The summary of this specification and operation of the index and drive mechanism for Automatic Car Park is as follows:

Referring specifically to Figure 19, ramp 121 has four drive-ins 122, and four drive-outs 123. There are always empty carriages stationed by the four drive-ins ready to be loaded. The recesses in the carriage tops and the ramp are on the same level.

After these stationed carriages in front aisle 124 are other empty carriages, as many in number as are required up to the first drive-out 123, therefore one or more loaded out-coming carriages will automatically stop behind the empties in line with the drive-out openings.

The very first of the stationed empty carriages in line with the drive-ins in front aisle 124 (see arrows) is halted manually by turning the control switch 148 of the carriage from forward to stop.

The car to be parked is backed into the recess of the carriage top and the rear tires of the car automatically lock themselves by locking mechanism 156. (Figure 15.)

Assuming the four carriages in the drive-ins are loaded, switch 148 of the very first carriage is manually set to forward position, and the rest of the carriages will move up automatically one by one. The attendant will allow all the loaded carriages to pass by and turn down the switch from forward to stop of the empty carriage next in line. If the outside attendant stores more carriages than he receives from unloading, he asks the inside attendant over the intercommunicating system for more empties.

If the need arises the full length of the ramp can be exposed and a larger number of cars can be driven on or off at the same time.

A carriage obtains its electrical energy from the overhead ribbon and the charged rails. The carriage is supported on the rails by sixteen racers 111. These racers will keep the carriage from bouncing as it passes over the gaps at the pivots at the intersection.

The carriage is guided on the rails by four sprocket wheels. These sprocket wheels project between the joined rails 130.

The carriage is driven by two sprocket wheels. These sprocket wheels mesh onto the rollers between the joined rails. This method of drive guarantees a positive, non-slip motion and will always hold the carriage's front line at a right angle with the rails.

A carriage will index at the intersection when the index fingers 113 of the driver housings is actuated by the blocks secured on casings 134. The indexing takes place when the centers of the gear drive housings become centralized with the four pivots of the intersections. When the driver housings index, as previously described, the index fingers roll away from the blocks and the carriage, if the motor is running and the carriage isn't halted by its front switch, will move on. The four pivots of the intersection will be turned by the sprocket wheels and said pivot heads are constructed so that after each turn of the pivot heads alignment with the rails is maintained.

The four loaded carriages which were assumed to be loaded, and which were started on their way by the outside attendant to be stored, will proceed in the front aisle up to the intersection and index as just described. After the first carriage is indexed it will proceed up into entrance aisle 125. While the first carriage is moving up off the intersection, the edge of said carriage holds the switch of the following carriage depressed for the entire length of the first carriage.

After the first carriage leaves the intersection the following carriages will proceed in the identical manner, one by one. Precisely in this manner any change of direction of the carriages in the Automatic Car Park is accomplished.

As the first carriage proceeds up aisle 125 followed by the others, it will come to the entrance of the first bin. If the configuration of the index fingers 113 of the carriage corresponds to the configuration of the index blocks 142, the carriage will index and enter the bin, but if the configurations do not correspond the carriage, without stopping, would continue until it meets its corresponding configuration and then index and enter the bin.

The following description will be better understood if the reader refers to the completed bin 120 (see Figures 18 and 19). Since the other bins are identical and work in precisely the same manner they are not shown.

Completed bin 120 is thus filled to capacity by the method previously described. Any desired carriages, regardless of their location, can be brought out automatically to the drive-out ramp. This shall be termed Discharge from the bin.

The procedure to discharge carriages from the bin is as follows: When the inside attendant, who has charge of all six bins, receives a call over the intercommunicating system requesting any number of cars (for better understanding let us say eighteen cars are requested for discharge), he notes the letters of the bins and the identification numbers of the carriages and he proceeds to locate them. Of the eighteen requested cars nine of them are located in bin 120. The attendant enters bin 120 from the exit side of the bin and walks into the safety path 233 in aisle 98, and after picking the proper carriages by means of their identification plates, located in plain view on the tripod post above the car tops, he turns down the selector lever of each of the carriages that are to be discharged from this aisle.

After selecting all the requested cars in aisle 98, he enters the safety path 233 in aisle 99 and proceeds towards the exit turning down the selector lever of the requested carriages. Reaching the exit the attendant pushes in the button on the panel board marked nine (since in this case nine of the requested cars are in this bin) and proceeds to the other bins to select the other nine cars in the same manner.

When control button number nine has been depressed, insulated ribbon 226 becomes charged, even though limit switch 225 is still depressed by the edge of a carriage, and this ribbon 226 will remain charged until the last of the nine selected carriages leaves the bin.

Because of ribbon 226 becoming charged the carriage in First Stop will move up to the intersection (see arrows) and the other carriages in that aisle will follow. When the last of the carriages in this aisle have moved not more than a couple of inches, thus releasing switch 230, the insulated ribbon 229 of the Second Stop becomes charged and that carriage, meaning the carriage in the Second Stop, will move up to the intersection.

After the carriage from the First Stop and the carriage from the Second Stop have reached their respective intersections, they index and continue in a clockwise direction (designated by the arrows). Once around the bin shall be termed as a Cycle. During one cycle, as now is readily understood, all of the carriages will have occasion to pass by the exit.

As the selected carriages, nine in this case, come up to the exit and because their selector lever is down (therefore their index fingers are lifted and they will not index) they will pass over the intersection of the exit. (See Figure 10 the dotted line indicates fingers in raised position).

As each of the carriages exit the trigger 183 of the carriage depresses switch block 197 and its exit is counted. As the ninth carriage exits it will depress block 197 the ninth time. At that instant the control board neutralizes the insulated ribbon 226 and so limit switch 225 will stop the first carriage coming to it and the others in line will stop in the manner already described.

The immediate instant after the trigger has depressed the switch block, the trigger hinges back releasing the selector lever to its neutral position thus releasing the fingers of the carriage and so the carriage will be able to index and continue on out to the drive-out ramp.

Since all these actions, as just summarized, are automatic the carriages are able to store themselves in very close quarters.

The illustrated car park containing three hundred cars need be attended by only two men, and the area of this car park is calculated to be equal to the area now required by one hundred cars parked the conventional way.

The possibility of storing cars with such carriages on a surface or surfaces one over the other will accommodate thousands of cars. The structure main floor is only finished off with concrete flooring, the other storing levels of the structure, below or above said finished floor could be left without finish. The skeleton of the I-beams of the structure with cat-walks for the attendant's use will be sufficient.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A track switch system for a garage comprising a horizontal supporting structure, rails secured to said horizontal supporting structure, carriages mounted on said rails, electric power ribbons mounted in said garage above said rails, drive means for said carriages, support means for connecting said drive means to said ribbons, said rails comprising spaced rail sections having rollers rotatably mounted and extending therebetween, turntables at the intersections of said rails, each of said carriages comprising a platform having a plurality of drive housings depending therefrom for supporting said platform, sprockets in said drive housings, means for driving said sprockets about a horizontal axis, and means for simultaneously indexing said sprockets in ninety degree increments about a vertical axis, said sprockets being indexed when on selected of said turntables, said turntables rotating with said sprockets when said sprockets are indexed.

2. A track switch system for a garage comprising a horizontal supporting structure, rails secured to said horizontal supporting structure, carriages mounted on said rails, electric power ribbons mounted in said garage above said rails, drive means for said carriages, support means for connecting said drive means to said ribbons, said rails comprising spaced rail sections having rollers rotatably mounted and extending therebetween, turntables at the intersections of said rails, each of said carriages comprising a platform having a plurality of drive housings depending therefrom for supporting said platform, sprockets in said drive housings, drive means for driving said sprockets about a horizontal axis, and means for simultaneously indexing said sprockets in ninety degree increments about a vertical axis including shafts interconnecting each of said drive housings for indexing all of said drive housings simultaneously, said sprockets being indexed when on selected of said turntables, said turntables rotating with said sprockets when said sprockets are indexed, said platform having grooves therein for receiving the wheels of a vehicle.

3. A system for a garage comprising a horizontal supporting structure, rails secured to said horizontal supporting structure, carriages mounted on said rails, electric power ribbons mounted in said garage above said rails, drive means for said carriages, support means for connecting said drive means to said ribbons, each of said carriages comprising a platform having a plurality of drive housings depending therefrom for supporting said platform, sprockets in said drive housings, means for driving said sprockets about a horizontal axis, means for indexing said sprockets in ninety degree increments about a vertical axis, said platform having grooves therein for receiving the wheels of a vehicle, locking means for engaging wheels of a vehicle to hold a vehicle on the carriage, said locking means including rollers engageable by wheels of the vehicle, driven sprockets rotatable with said rollers, racks engageable with said driven sprockets, links pivotally attached to said racks, and a stop roller carried by said links.

4. A carriage for use in a storage arrangement for a garage comprising a platform having a plurality of drive housings depending therefrom for supporting said platform, each of said drive housings comprising a stationary member, a cylindrical member rotatably disposed in said stationary member, an axle mounted in said cylindrical member, a sprocket wheel on said axle, locking means engaging said cylindrical member to lock said cylindrical member against rotation with respect to said stationary member, drive means in said drive housing for rotating said axle and said sprocket wheel including a gear train, an index gear means in said cylindrical member for rotating said cylindrical member, an unlocking means in said locking means to release said cylindrical member for indexing, and a blocking means in said housing to stop rotation of said sprocket about a horizontal axis while said cylindrical member is being rotated about a vertical axis.

5. A track switch system for a garage comprising a horizontal supporting structure, rails secured to said horizontal supporting structure, carriages mounted on said rails, electric power ribbons mounted in said garage above said rails, drive means for said carriages, support means for connecting said drive means to said ribbons, said rails comprising spaced rail sections having rollers rotatably mounted and extending therebetween, turntables at the intersections of said rails, each of said carriages comprising a platform having a plurality of drive housings depending therefrom for supporting said platform, sprockets in said drive housings, drive means for driving said sprockets about a horizontal axis, and means for simultaneously indexing said sprockets in ninety degree increments about a vertical axis including shafts interconnecting each of said drive housings for indexing all of said drive housings simultaneously, said sprockes being indexed when on selected of said turntables, said turntables rotating with said sprockets when said sprockets are indexed, said platform having grooves therein for receiving the wheels of a vehicle, said drive housings having stationary members, cylindrical members rotatably disposed in said stationary members, axles mounted in said cylindrical members having said sprockets secured thereon, locking means engaging said cylindrical members to lock said cylindrical members against rotation with respect to said stationary member, said drive means including gear trains in said housings, unlocking means in said housing engageable with said locking means to release said cylindrical members for indexing, and blocking means in said housings to stop rotation of said sprockets about said horizontal axis while said cylindrical member is being rotated about a vertical axis, said shafts being connected to and actuating said gear trains.

References Cited in the file of this patent

UNITED STATES PATENTS

| Number | Name | Date |
|---|---|---|
| 731,643 | Williams et al. | June 23, 1903 |
| 787,590 | Sessions | Apr. 18, 1905 |
| 1,027,073 | Sessions et al. | May 21, 1912 |
| 1,423,947 | Kramer et al. | July 25, 1922 |
| 1,538,925 | Buckham | May 26, 1925 |
| 1,574,822 | Koch | Mar. 2, 1926 |
| 1,584,080 | Dinkelberg | May 11, 1926 |
| 1,584,517 | Dinkelberg | May 11, 1926 |
| 1,627,959 | Disney | May 10, 1927 |
| 1,775,799 | Young | Sept. 16, 1930 |
| 1,816,053 | McGavin | July 28, 1931 |
| 1,862,632 | Perin | June 14, 1932 |
| 2,120,792 | Yanney | June 14, 1938 |
| 2,445,436 | Johnson et al. | July 20, 1948 |
| 2,469,575 | Ralston et al. | May 10, 1949 |
| 2,605,911 | Medway | Aug. 5, 1952 |
| 2,607,536 | White | Aug. 19, 1952 |
| 2,631,885 | Ault | Mar. 17, 1953 |
| 2,722,322 | Gunderson | Nov. 1, 1955 |
| 2,729,352 | Hodges et al. | Jan. 3, 1956 |